United States Patent
Yamanaka et al.

(10) Patent No.: US 12,138,889 B2
(45) Date of Patent: Nov. 12, 2024

(54) DECORATIVE SHEET AND DISPLAY DEVICE

(71) Applicant: DAI NIPPON PRINTING CO., LTD., Tokyo-to (JP)

(72) Inventors: Naoto Yamanaka, Tokyo-to (JP); Tsuyoshi Amano, Tokyo-to (JP); Masato Mizuochi, Tokyo-to (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 788 days.

(21) Appl. No.: 17/270,326

(22) PCT Filed: Aug. 21, 2019

(86) PCT No.: PCT/JP2019/032634
§ 371 (c)(1),
(2) Date: Feb. 22, 2021

(87) PCT Pub. No.: WO2020/040195
PCT Pub. Date: Feb. 27, 2020

(65) Prior Publication Data
US 2021/0178733 A1  Jun. 17, 2021

(30) Foreign Application Priority Data

Aug. 22, 2018 (JP) .................................. 2018-155536
Jan. 18, 2019 (JP) .................................. 2019-007179

(51) Int. Cl.
*B32B 27/06* (2006.01)
*B32B 3/26* (2006.01)
(Continued)

(52) U.S. Cl.
CPC .............. *B32B 27/06* (2013.01); *B32B 3/266* (2013.01); *G02F 1/133512* (2013.01);
(Continued)

(58) Field of Classification Search
None
See application file for complete search history.

(56) References Cited

U.S. PATENT DOCUMENTS

| 6,091,194 A * | 7/2000 | Swirbel | H10K 59/1275 |
| | | | 345/206 |
| 2002/0054440 A1 * | 5/2002 | Akamine | G01D 11/28 |
| | | | 359/893 |

(Continued)

FOREIGN PATENT DOCUMENTS

| JP | H09-114003 A | 5/1997 |
| JP | 2001-331132 A | 11/2001 |

(Continued)

OTHER PUBLICATIONS

Apr. 20, 2022 Extended Search Report issued in European Patent Application No. 19852080.1.

(Continued)

*Primary Examiner* — Ryan Crockett
(74) *Attorney, Agent, or Firm* — Oliff PLC (57) ABSTRACT

A decorative sheet, a display device with a decorative sheet, and a display device with a panel are excellent in visibility of a picture pattern of the decorative sheet. The decorative sheet includes the picture pattern portion and a plurality of the transmitting portions that are portions in which the picture pattern portion is not formed, an aperture ratio is 5% or more and 50% or less, and each of the transmitting portions is formed such that a distance between the transmitting portions adjacent to each other is 40 μm or more.

4 Claims, 6 Drawing Sheets

(51) Int. Cl.
*G02F 1/1335* (2006.01)
*G09F 19/12* (2006.01)

(52) U.S. Cl.
CPC ........ *G09F 19/12* (2013.01); *B32B 2307/412* (2013.01); *B32B 2457/20* (2013.01)

(56) References Cited

U.S. PATENT DOCUMENTS

| | | | | |
|---|---|---|---|---|
| 2002/0130986 | A1* | 9/2002 | Richard | G02B 6/0053 349/62 |
| 2012/0110881 | A1* | 5/2012 | Kang | G09F 19/12 216/41 |
| 2013/0344306 | A1* | 12/2013 | Arai | B29C 45/14811 428/207 |
| 2014/0234594 | A1* | 8/2014 | Ito | B32B 27/308 428/203 |
| 2016/0370902 | A1* | 12/2016 | Aridomi | H04M 1/22 |
| 2017/0334293 | A1* | 11/2017 | Kawamoto | G02B 5/0278 |
| 2023/0015959 | A1* | 1/2023 | Yoshida | G09G 3/3648 |

FOREIGN PATENT DOCUMENTS

| | | | |
|---|---|---|---|
| JP | 2009-187902 | A | 8/2009 |
| JP | 2010113348 | A * | 5/2010 |
| JP | 2012-083589 | A | 4/2012 |
| JP | 5688573 | B2 | 3/2015 |
| WO | 2013/058353 | A1 | 4/2013 |

OTHER PUBLICATIONS

Mar. 22, 2019 Office Action issued in Japanese Patent Application No. 2019-024673.
Aug. 2, 2019 Office Action issued in Japanese Patent Application No. 2019-024673.
Dec. 10, 2019 Office Action issued in Japanese Patent Application No. 2019-024673.
Nov. 19, 2019 Search Report issued in International Patent Application No. PCT/JP2019/032634.
Feb. 23, 2021 International Preliminary Report on Patentability issued in International Patent Application No. PCT/JP2019/032634.

* cited by examiner

DECORATIVE SHEET AND DISPLAY DEVICE

TECHNICAL FIELD

The present invention relates to a decorative sheet, a display device with a decorative sheet, and a display device with a panel having the decorative sheet.

BACKGROUND ART

For example, a display device that displays image light, as described in Patent Literature 1, has been known. Such a display device is usually observed in black when no image is displayed. Meanwhile, design properties are very important in, for example, surface members for automobiles, furniture, and housing building materials, and the like. At present, display devices applied in various fields are expected not only to have a function of simply displaying an image, but also to be in harmony with the surrounding environment in terms of design properties.

In order to impart the design properties to the display device, it has been proposed to provide a decorative sheet so as to face a display surface of the display device. The decorative sheet can impart the design properties in harmony with the surrounding environment of the display device. Further, in order to allow the image light of the display device to transmit through the decorative sheet, such a decorative sheet has a light transmitting portion such as a hole in a region facing the display surface of the display device, as described in Patent Literature 2.

CITATION LIST

Patent Literature

Patent Literature 1: JP 1997-114003 A
Patent Literature 2: JP 5688573 B

SUMMARY OF INVENTION

Technical Problem

Patent Literature 2 discloses that the spacing between the holes in a colored front panel is smaller than the pixel size of a dot matrix display in order to make an image on a display device clear. However, Patent Literature 2 mainly presupposes a single color front panel, and does not assume a decorative sheet having a complicated picture pattern such as wood grain texture or marble texture.

The present invention has been made in view of the above points, and an object of the invention is to provide a decorative sheet, a display device, and a display device with a panel that are excellent in visibility of a picture pattern of the decorative sheet.

Solution to Problem

In order to solve the above problems, the decorative sheet according to the present invention includes a picture pattern portion and a plurality of transmitting portions that are portions in which the picture pattern portion is not formed, wherein an aperture ratio is 5% or more and 50% or less, and each of the transmitting portions is formed such that a distance between the transmitting portions adjacent to each other is 40 µm or more.

In addition, the picture pattern portion may include a pattern that is not monochromatic and contain an inorganic pigment or an organic pigment.

Further, each of the transmitting portions may have a circular shape when observed from a normal direction of the decorative sheet. The transmitting portions may be arranged in a grid pattern when observed from the normal direction of the decorative sheet. Each of the transmitting portions may be formed such that the distance between the transmitting portions adjacent to each other is 100 µm or more.

The decorative sheet according to the present invention may further include a base material portion that supports the picture pattern portion and each of the transmitting portions, and each of the transmitting portions may be formed of a transparent material having a refractive index of ±0.2 of a refractive index of the base material portion.

The display device with a decorative sheet according to the present invention includes a display device having a display surface and the decorative sheet that is described above and provided to face the display surface. Further, the display device with a decorative sheet according to the present invention includes a display device having a display surface and a decorative sheet having a picture pattern portion and a plurality of transmitting portions that are portions in which the picture pattern portion is not formed, wherein the display device is a dot matrix display, and a pitch of each of the transmitting portions is larger than a pitch of a pixel on the display surface. The display surface may include a non-light emitting portion that is configured as a black matrix having a width of 1 µm or more and 30 µm or less.

The display device with a panel according to the present invention includes a display device having a display surface, the decorative sheet that is described above and provided to face the display surface, and a panel member that is arranged between the display surface and the decorative sheet. Further, the display device with a panel according to the present invention includes a display device having a display surface, a decorative sheet including a picture pattern portion and a plurality of transmitting portions that are portions in which the picture pattern portion is not formed, and a panel member that is arranged between the display surface and the decorative sheet, wherein the display device is a dot matrix display, and a pitch of each of the transmitting portions is larger than a pitch of a pixel on the display surface.

Advantageous Effects of Invention

According to the present invention, it is possible to achieve the decorative sheet, the display device, and the display device with a panel that are excellent in visibility of a picture pattern of the decorative sheet.

BRIEF DESCRIPTION OF DRAWINGS

FIG. 6 is an enlarged front view of the decorative sheet in a case where the picture pattern portion of the decorative sheet according to the present embodiment contains a pearl pigment or the like.

DESCRIPTION OF EMBODIMENTS

Hereinafter, one of the embodiments of the present invention (hereinafter, referred to as "present embodiment") will be described with reference to the drawings. In the drawings attached to the present specification, the scale, aspect ratio, and the like are appropriately changed from the actual ones and exaggerated for the convenience of illustration and understanding.

Note that, in the present specification, the terms "layer", "sheet", and "film" are not distinguished from each other based only on the difference in designation. For example, the term "sheet" is a concept that also includes members that may be called layers or films.

In addition, as used in the present specification, the terms such as "parallel", "orthogonal", and "identical" and the values of length and angle that specify the shape, geometric conditions, and degree thereof are interpreted so as to include the range in which similar functions can be expected without being bound by the strict meaning.

A decorative sheet 50, a display device 20 with a decorative sheet, and a display device 10 with a panel according to the present embodiment will be described.

Figure 1:
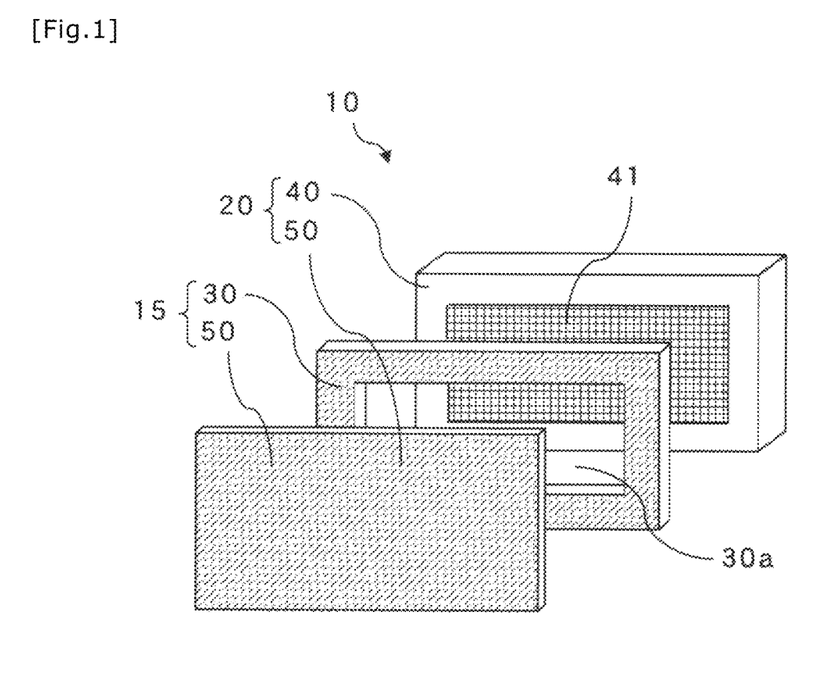
FIG. 1 is an exploded perspective view schematically illustrating a display device with a panel according to the present embodiment.
Figure 2:
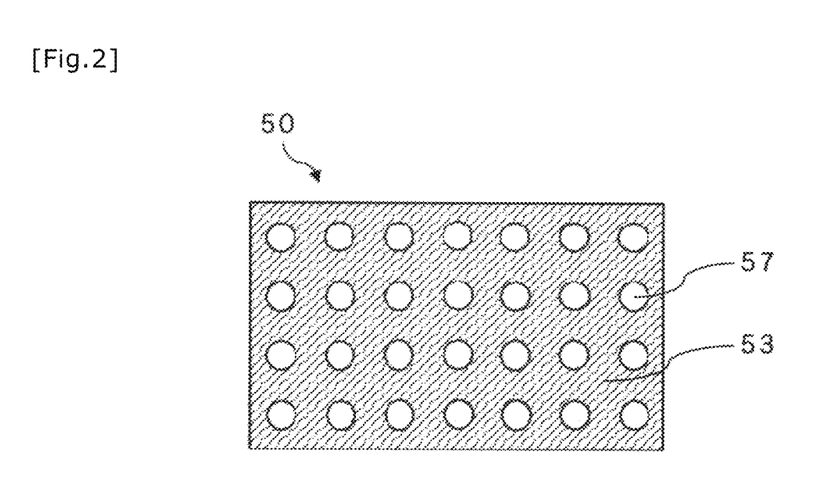
FIG. 2 is an enlarged front view of a decorative sheet according to the present embodiment.
Figure 3:
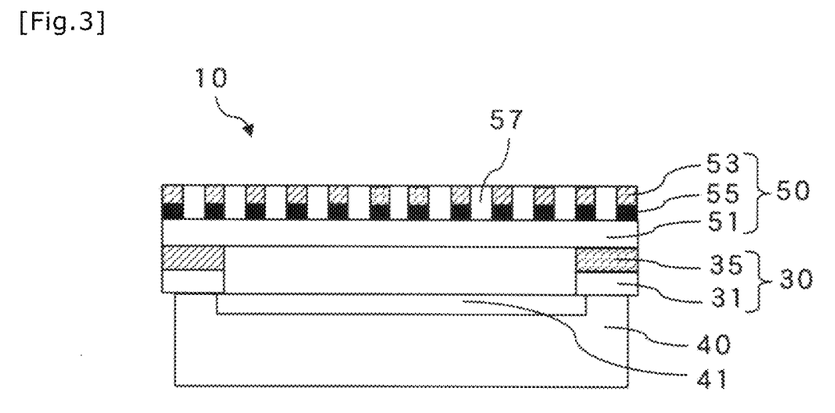
FIG. 3 is a cross-sectional view of the display device with a panel according to the present embodiment.

FIG. 1 is an exploded perspective view schematically illustrating the display device 10 with a panel according to the present embodiment. FIG. 2 is an enlarged front view of the decorative sheet 50 according to the present embodiment. FIG. 3 is a cross-sectional view of the display device 10 with a panel according to the present embodiment.

The decorative sheet 50 includes a picture pattern portion 53 on which a picture pattern is formed, and a transmitting portion 57 that transmits image light from a display surface 41 of a display device 40.

The display device 20 with a decorative sheet includes the display device 40 having the display surface 41 and the decorative sheet 50 provided so as to face the display surface 41.

The display device 10 with a panel includes the display device 40 having the display surface 41 and a panel 15 provided so as to face the display surface 41, and the panel 15 includes a panel member 30 having an opening 30a and the decorative sheet 50.

The display device 10 with a panel is thus configured such that image light emitted from the display surface 41 of the display device 40 passes through the opening 30a of the panel member 30 and the transmitting portion 57 of the decorative sheet 50 to be observed by an observer from the normal direction of the display surface 41.

In the example of FIG. 1, the decorative sheet 50, the display device 20 with a decorative sheet, and the display device 10 with a panel are illustrated in a flat plate shape, but these components may have a curved shape.

The display device 40 is a device that emits image light, and includes the display surface 41 capable of emitting image light. The display device 40 according to the present embodiment is a dot matrix liquid crystal display. The decorative sheet 50, the display device 20 with a decorative sheet, and the display device 40 with a panel according to the present invention are configured to be suitably used particularly in a display device with a dot matrix display. Examples of the dot matrix display include, in addition to a liquid crystal display, an organic EL display, an inorganic EL display, a plasma display, an LED display, a millimeter LED display, a micro LED display, and a quantum dot display. Further, it is preferable that the display device 40 can emit image light having a luminance of 300 cd/m$^2$ or more from the viewpoint of the visibility of image light observed through the transmitting portion 57 of the decorative sheet 50.

The panel member 30 is arranged between the display device 40 and the decorative sheet 50, and includes the opening 30a. The panel member 30 is, for example, a plate-like member having a thickness of 0.5 mm. The panel member 30 is arranged so that the display surface 41 of the display device 40 is located in the opening 30a when observed from the normal direction to the display surface 41.

The panel member 30 includes a base material layer 31 and a design layer 35 provided on the base material layer 31. The base material layer 31 is a member capable of properly supporting the design layer 35. The design layer 35 is a member for imparting design property to the panel member 30, and is typically a dark color such as black. Such a design layer 35 is formed of, for example, a resin containing a black pigment. Examples of the black pigment include carbon black and titanium black. The design layer 35 may impart any design property such as wood grain texture or marble texture depending on the environment in which the panel member 30 is provided. Further, if the design layer 35 is not required, the design layer 35 may be eliminated.

The panel member 30 of the present embodiment has a hollow square shape having the rectangular opening 30a. However, the embodiment of the present invention is not limited thereto, and the panel member 30 may have a shape obtained by removing a part of a rectangle, such as an L-shape or a U-shape. Further, the panel member 30 is not limited to a rectangular shape, and may have any shape such as a circular shape. Furthermore, the opening 30a may also have any shape.

Further, the panel member 30 of the present invention may be formed such that the opening 30a is not formed and a portion facing the display surface 41 of the display device 40 is transparent. Furthermore, the panel member 30 may be composed of the transparent base material layer 31 and the design layer 35, and may have the opening 30a only in the design layer 35. Moreover, the panel member 30 may be entirely transparently formed without having the design layer 35. Further, the panel member 30 may be formed as a semi-transparent smoke plate as a whole.

The decorative sheet 50 includes a base material portion 51, the picture pattern portion 53 and a shielding portion 55 provided on the base material portion 51, and the transmitting portion 57 that is a portion in which the picture pattern portion 53 and the shielding portion 55 are not formed.

The base material portion 51 properly supports the picture pattern portion 53 and the shielding portion 55 provided on the base material portion 51. The base material portion 51 is a transparent film-like member. Any material that can transmit visible light and properly support the picture pattern portion 53 and the shielding portion 55 may be used for the base material portion 51, and examples of the material include polymethyl methacrylate, polyethylene terephthalate, polyethylene naphthalate, polycarbonate, polystyrene, and cyclic polyolefin. Further, the base material portion 51 preferably has a thickness of 10 μm or more and 500 μm or less in view of visible light transmission properties and proper supportability of the picture pattern portion 53 and the shielding portion 55.

The shielding portion 55 is arranged between the picture pattern portion 53 and the base material portion 51, and covers the picture pattern portion 53 from the side of the base material portion 51. The shielding portion 55 has a function of absorbing light so that the image light from the display surface 41 of the display device 40 does not enter the picture pattern portion 53. The shielding portion 55 may contain, for example, light absorbing particles in a binder resin. Examples of the light absorbing particles include black pigments such as carbon black and titanium black. As a specific example, the thickness of the shielding portion 55 is 1 μm or more and 20 μm or less.

Any picture pattern such as wood grain texture, marble texture, geometric patterns, carbon texture, stripes, polka dots, and single color may be formed in the picture pattern portion 53. However, the decorative sheet 50 according to the present invention is configured such that the picture pattern portion suitably includes a picture pattern such as wood grain texture and marble texture, or a picture pattern formed by using pigments such as mica, iron oxide, aluminum powder, and carbon black.

The resolution of the picture pattern portion 53 is preferably 150 dpi (dot pitch of about 169 μm) or higher from the viewpoint of the clarity of the design of the picture pattern portion 53 to be observed, and is more preferably 300 dpi (dot pitch of about 85 μm) or higher from the viewpoint of the clarity of the design having substantially the same resolution as a photo magazine or a catalog. Further, from similar viewpoints, the picture pattern portion 53 is preferably formed by printing 75 or more of printing lines, and is more preferably formed by printing 150 or more of printing lines.

The picture pattern portion 53 is covered by the shielding portion 55 from the side of the display device 40. The shielding portion 55 prevents image light from entering the picture pattern portion 53. Consequently, it is possible to prevent the image light from being transmitted through the picture pattern portion 53, and the design represented by the picture pattern portion 53 and the image light from being observed in a mixed manner. That is, it is possible to effectively prevent the color reproducibility of an image from being degraded due to the absorption of visible light in a specific wavelength range in the picture pattern portion 53.

The transmitting portion 57 is a portion in which the picture pattern portion 53 is not formed when observed from the front of the decorative sheet 50, and can transmit image light from the display surface 41 of the display device 40.

The transmitting portion 57 of the present embodiment is formed of a transparent resin having a refractive index of ±0.2 of the refractive index of the base material portion 51. The transmitting portion 57 may be a hole or a void. However, as a result of research, the inventors of the present invention have found that, if the transmitting portion 57 is formed of a transparent resin having a refractive index of ±0.2 of the refractive index of the base material portion 51, the transmitting portion 57 becomes less noticeable when the decorative sheet is observed closely. Since an acrylic resin having a refractive index of 1.53 to 1.57 is usually used as the base material portion 51 of the decorative sheet 50, a polymethyl methacrylate resin, a fluorine resin, a silicone resin, polypropylene, a urethane resin, polyethylene, nylon, polyvinyl chloride, epoxy, polycarbonate, polystyrene and the like having a refractive index of 1.33 to 1.77 are preferable as the material of the transmitting portion 57.

Figure 4:
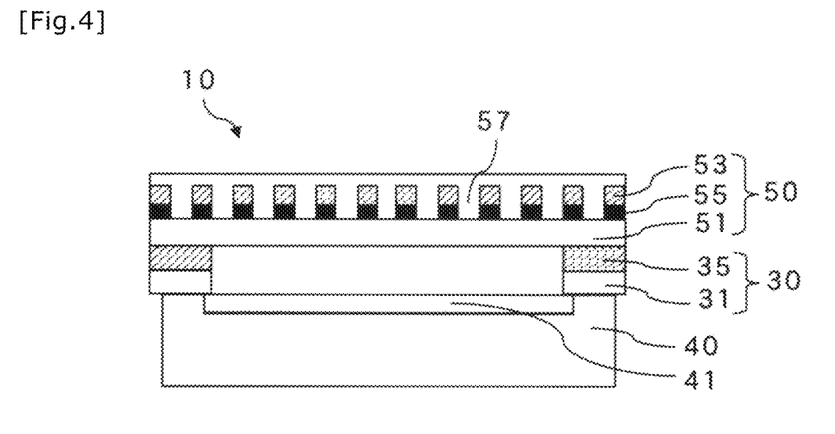
FIG. 4 is a cross-sectional view of a display device with a panel according to another embodiment of the present invention.

Further, the transmitting portion 57 formed of such a transparent resin may cover the picture pattern portion 53 and the shielding portion 55, as illustrated in FIG. 4. Such a transmitting portion 57 functions as a transparent protective film that protects the picture pattern portion 53 and the shielding portion 55.

Note that in the present specification, "transparent" in "transparent base material" means the transparency to the extent that the transparent base material can be seen through from its one side toward the other side, and has a visible light transmittance of, for example, 30% or more, more preferably 70% or more. The visible light transmittance is specified as the average value of the transmittance at each wavelength measured within a measurement wavelength range of 380 nm to 780 nm using a spectrophotometer ("UV-3100PC" manufactured by SHIMADZU CORPORATION, JIS K 0115 compliant product).

Figure 5:
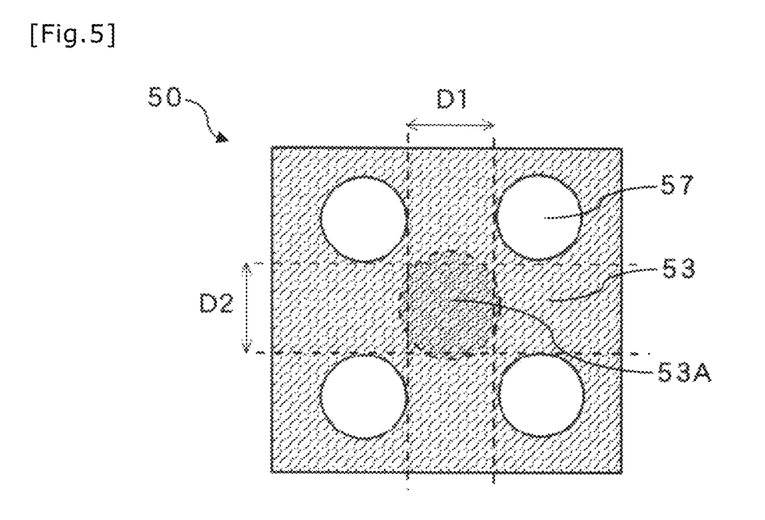
FIG. 5 is an enlarged front view illustrating an arrangement of transmitting portions of the decorative sheet according to the present embodiment.

FIG. 5 is an enlarged front view illustrating an arrangement of the transmitting portions 57 of the decorative sheet 50 according to the present embodiment.

In a state where an image is displayed on the display surface 41 of the display device 40, image light is transmitted through the opening 30a of the panel member 30 and the transmitting portion 57 of the decorative sheet 50, and is observed by an outside observer. The ratio of the transmitting portion 57 to the area of the decorative sheet 50 facing the display surface 41 of the display device 40 (hereinafter referred to as "aperture ratio") is preferably 5% or more so that the observer can observe the image light that meets practical use as a display device, and more preferably 10% or more so that the observer can observe the image light with sufficient brightness. Further, this aperture ratio is preferably 5% or more and more preferably 10% or more when a high-brightness display is used as the image light, and is preferably 15% or more when a normal display is used as the image light.

In a case where no image is displayed on the display surface 41 of the display device 40, the picture pattern on the picture pattern portion of the decorative sheet 50 is observed. The aperture ratio of the decorative sheet 50 is preferably 50% or less so that the observer can clearly observe the design of the decorative sheet 50 that meets practical use, and is more preferably 25% or less so that the observer can observe the design of the decorative sheet 50 more clearly. In addition, this aperture ratio is preferably 50% or less in order to allow the limited pattern design to be clearly observed, preferably 40% or less in order to allow high-brightness designs including silver and pearl to be clearly observed, and preferably 30% or less in order to allow normal designs such as wood grain to be clearly observed and the presence of the display device 40 to be sufficiently concealed.

The aperture ratio of the decorative sheet 50 is the ratio of the area occupied by the transmitting portion 57 to the decorative sheet 50, and can be calculated using the formula (aperture ratio)=(total area of transmitting portion 57)/((total area of picture pattern portion 53)+(total area of transmitting portion 57)).

The transmitting portion 57 of the decorative sheet 50 according to the present embodiment is formed by arranging the circular transmitting portions 57 in a square grid pattern when observed from the normal direction of the decorative sheet 50. The transmitting portions 57 do not need to be arranged in a square grid pattern and in a grid pattern. However, when the transmitting portions 57 are formed in a grid pattern, the image light from the display device 40 is uniformly transmitted, so that the image on the display device 40 is less likely to be uneven. Further, when the transmitting portions 57 are arranged in a square grid pattern, the image on the display device 40 is less likely to be uneven. Consequently, as for the transmitting portion 57 of the decorative sheet 50, the circular transmitting portions 57 are preferably arranged in a grid pattern, and are more preferably arranged in a square grid pattern when observed from the normal direction of the decorative sheet 50. Furthermore, the transmitting portion 57 does not need to be circular. However, as will be described later, in order to suppress the diffusion of image light, the transmitting portion 57 of the decorative sheet 50 preferably has a circular shape when observed from the normal direction.

The transmitting portion 57 of the decorative sheet 50 according to the present embodiment is formed so that the distance between adjacent transmitting portions 57 is 40 μm or more. Here, the distance between the adjacent transmitting portions 57 means the distance between the edges of the adjacent transmitting portions 57. Further, the description that the distance between the adjacent transmitting portions 57 is 40 μm or more means that a shorter distance of distances D1 and D2 between the adjacent transmitting portions 57 is 40 μm or more when the transmitting portions 57 are formed in a grid pattern, and means that the average distance from each transmitting portion 57 to the closest transmitting portion 57 is 40 μm or more when the transmitting portions 57 are formed in a mode other than the grid pattern. In other words, in this embodiment, the shortest distance from the outer edge of one transmitting portion 57 freely selected to the outer edge of the other transmitting portion 57 is 40 μm or more.

As a result of research, the inventors of the present invention have found that when the picture pattern portion 53 of the decorative sheet 50 is observed at a short distance in a state where no image is displayed on the display device 40, if the distance between adjacent transmitting portions 57 is increased and the area of a region 53A where the picture pattern portion 53 surrounded by the transmitting portion 57 is continuous is also increased, the details of the picture pattern, which has the pattern of the decorative sheet 50, can be seen sharply, and conversely, if the distance between the adjacent transmitting portions 57 is reduced and the area of the region 53A where the picture pattern portion 53 surrounded by the transmitting portion 57 is continuous is also reduced, the details of the picture pattern of the decorative sheet 50 becomes blurred.

Furthermore, the inventors of the present invention have found that when the distance between adjacent transmitting portions 57 is longer than a distance corresponding to the size that can be identified by people, the details of the picture pattern having a pattern can be seen properly sharply. The size that can be identified by people with a visual acuity of 1.5 at a distance of 20 cm, which is a typical usage condition when the picture pattern having a pattern is consciously observed in a case where no image is displayed on the display device 40, is about 39 μm. Consequently, when the distance between the adjacent transmitting portions 57 is 40 μm or more, the details of the picture pattern having the pattern of the decorative sheet 50 look sharp enough to be suitable for practical use. As a result, it is preferable to form the transmitting portion 57 so that the distance between adjacent transmitting portions is 40 μm or more. The size that can be identified by people with a visual acuity of 1.0 at a distance of 30 cm, which covers most of the usage condition assumed when the picture pattern having a pattern is consciously observed in a case where no image is displayed on the display device 40, is about 87 μm. Consequently, when the distance between the adjacent transmitting portions 57 is 100 μm or more, the details of the picture pattern having the pattern of the decorative sheet 50 look sharp enough to be suitable for practical use. As a result, it is more preferable to form the transmitting portion 57 so that the distance between the adjacent transmitting portions 57 is 100 μm or more.

The size that can be identified by people can be calculated using the formula (size that can be identified by people [m])=2π/360/60/(visual acuity)×(distance to target [m]).

Meanwhile, when an image is displayed on the display device 40, if the distance between the adjacent transmitting portions 57 is longer than or equal to the distance corresponding to the size that can be identified by people, the image on the display device 40 is observed to be separated for each transmitting portion 57 of the decorative sheet 50.

The image on the display device 40 is usually observed from a distance of 50 cm or more, and in many cases about 80 cm, assuming a display device installed in an automobile. The size that can be identified by people with a visual acuity of 1.0 at a distance of 80 cm is about 233 μm. Consequently, assuming that the distance between the adjacent transmitting portions 57 is 230 μm or less, the image on the display device 40 is observed without being separated for each transmitting portion 57 of the decorative sheet 50. As a result, it is preferable to form the transmitting portion 57 so that the distance between the adjacent transmitting portions 57 is 230 μm or less. In addition, since the size that can be identified by people with a visual acuity of 1.5 at a distance of 80 cm is about 155 μm, it is more preferable to form the transmitting portion 57 so that the distance between the adjacent transmitting portions 57 is 150 μm or less. Further, since the size that can be identified by people with a visual acuity of 1.0 at a distance of 50 cm is about 145 μm, it is further preferable to form the transmitting portion 57 so that the distance between the adjacent transmitting portions 57 is 140 μm or less.

The size of the transmitting portion 57 is set so that the aperture ratio of the decorative sheet 50 is an appropriate value. As specific values of the distance between the adjacent transmitting portions 57 and the diameter of the transmitting portion 57, for example, it is assumed that the distance between the adjacent transmitting portions 57 is 120 μm and the diameter of the transmitting portion 57 is also 120 μm, and the aperture ratio of the decorative sheet 50 in this case is about 20%.

Figure 6:
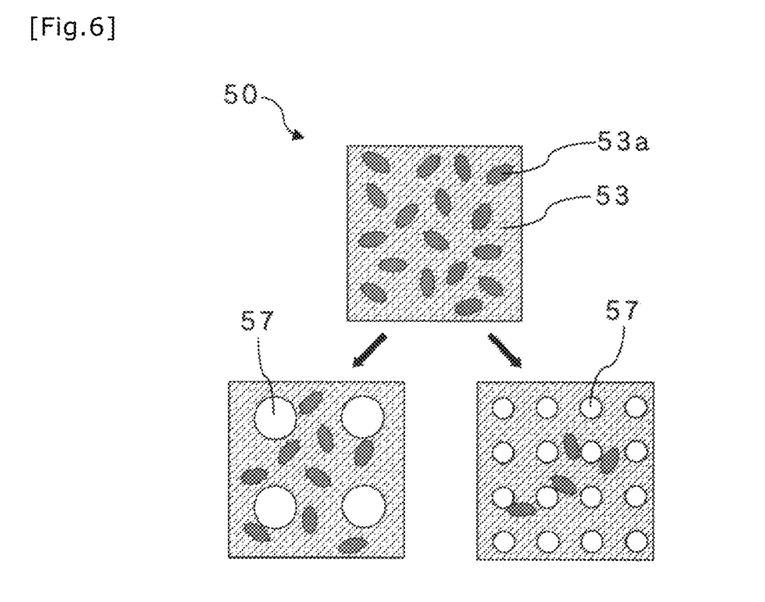

FIG. 6 is an enlarged front view of the decorative sheet 50 in a case where the picture pattern portion 53 of the decorative sheet 50 contains a pearl pigment 53a or the like.

The upper figure of FIG. 6 is an enlarged front view before the transmitting portion 57 is formed. The lower left figure of FIG. 6 is an enlarged front view after the transmitting portion 57 is formed so that the distance between adjacent transmitting portions 57 is 40 µm or more. The lower right figure of FIG. 6 is an enlarged front view after the transmitting portion 57 is formed so that the distance between the adjacent transmitting portions 57 is less than 40 µm.

The pearl pigment 53a is obtained by coating the surface of thin plate-like mica particles with titanium dioxide, and usually has a size of about 10 µm to several tens of µm. For this reason, if the transmitting portion 57 is formed so that the distance between the adjacent transmitting portions 57 is less than 40 µm, as illustrated in the lower right figure of FIG. 6, most of the pearl pigments 53a contained in the picture pattern portion 53 come off when the transmitting portion 57 is formed. On the other hand, if the transmitting portion 57 is formed so that the distance between the adjacent transmitting portions 57 is 40 µm or more, as illustrated in the lower left figure of FIG. 6, most of the pearl pigments 53a in the region surrounded by the transmitting portion 57 remain. This is not limited to pearl pigments, but also applied to other inorganic pigments or organic pigments such as flaky aluminum pigments. Examples of the inorganic pigment or the organic pigment include oxides, hydroxides, sulfides, chromates, silicates, sulfates, carbonates, pearl pigments, aluminum powders, carbons and the like.

Consequently, in the decorative sheet including the pearl pigment 53a or the like in the picture pattern portion 53, it is preferable to form the transmitting portion 57 so that the distance between the adjacent transmitting portions 57 is 40 µm or more. Further, if the distance between the adjacent transmitting portions 57 is 100 µm or more, the pearl pigment 53a is less likely to come off when the transmitting portion 57 is formed. Therefore, it is more preferable to form the transmitting portion 57 so that the distance between the adjacent transmitting portions 57 is 100 µm or more.

Figure 7:
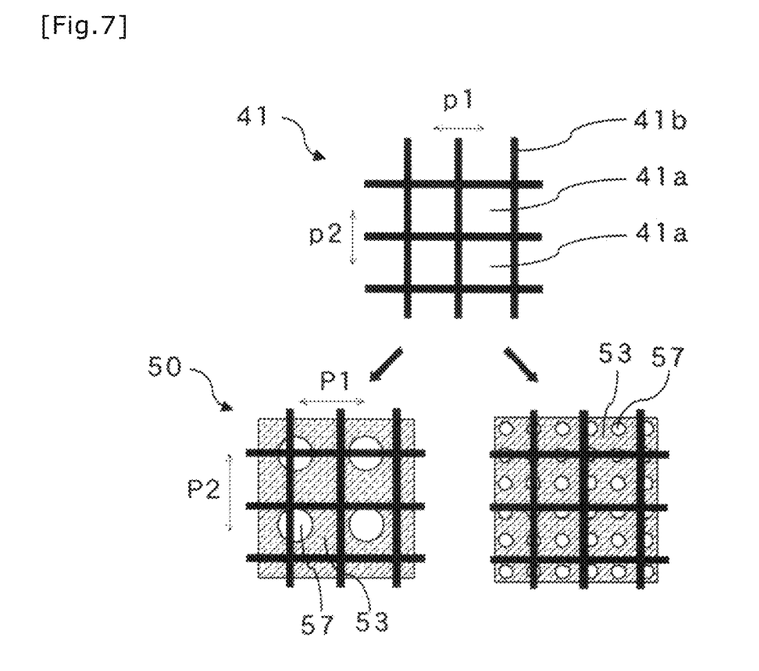
FIG. 7 is an enlarged front view illustrating a state where the decorative sheet according to the present embodiment is arranged so as to face a display surface of a dot matrix liquid crystal display.

FIG. 7 is an enlarged front view illustrating a state where the decorative sheet 50 is arranged so as to face the display surface 41 of the dot matrix liquid crystal display 40. The upper figure of FIG. 7 is an enlarged front view illustrating the display surface 41 of the liquid crystal display 40. The lower left figure of FIG. 7 is an enlarged front view in a case where the decorative sheet 50 is arranged in which the transmitting portion 57 is formed so that the pitch of the transmitting portion 57 of the decorative sheet 50 is larger than the pitch of a pixel 41a of the display surface 41. The lower right figure of FIG. 7 is an enlarged front view in a case where the transmitting portion 57 is formed so that the pitch of the transmitting portion 57 of the decorative sheet 50 is less than the pitch of the pixel 41a of the display surface 41.

Here, the pitch of the transmitting portion 57 refers to a distance P1, P2 between the centers of the adjacent transmitting portions 57, and the pitch of the pixel 41a refers to a distance p1, p2 between the centers of the adjacent pixels 41a. When the liquid crystal display 40 is a color display, one dot including RGB sub-pixels corresponds to the pixel 41a. The pitch of the pixel 41a is, for example, 191 µm in a 7-inch liquid crystal display with 800×480 pixels, 190 µm in an 11-inch liquid crystal display with 1280×720 pixels, 78 µm in a 7.9-inch liquid crystal display with 1536×2048 pixels, and 44 µm in a 5.8-inch liquid crystal display with 1440×2960 pixels.

As illustrated in the upper figure of FIG. 7, the display surface 41 of the liquid crystal display 40 includes a plurality of the pixels 41a arranged in a grid pattern and a non-light emitting portion 41b between the pixels 41a. The non-light emitting portion 41b between the pixels 41a is usually configured as a black matrix, and its width is about 1 µm to 30 µm. As illustrated in the lower left figure and the lower right figure of FIG. 7, most of the plurality of transmitting portions 57 of the decorative sheet 50 overlap the non-light emitting portion 41b of the display surface 41 of the liquid crystal display 40.

Consequently, the possibility that the transmitting portion 57 of the decorative sheet overlaps a specific region of the non-light emitting portion 41b of the display surface 41 of the liquid crystal display 40 in a case where the pitch of the transmitting portion 57 is less than the pitch of the pixel 41a is higher than that in a case where the pitch of the transmitting portion 57 is larger than the pitch of the pixel 41a.

Further, assuming that the aperture ratio of the decorative sheet 50 is constant, when the pitch of the transmitting portion 57 increases, the area occupied by one transmitting portion 57 on the decorative sheet 50 also increases, and when the pitch of the transmitting portion 57 decreases, the area occupied by one transmitting portion 57 on the decorative sheet 50 also decreases. That is, assuming that the aperture ratio of the decorative sheet 50 is constant, when the pitch of the transmitting portion 57 increases, the transmitting portions 57 having a large area are arranged at a large pitch, and when the pitch of the transmitting portion 57 decreases, the transmitting portions 57 having a small area are arranged at a small pitch.

As illustrated in the lower left figure of FIG. 7, in a case where the pitch of the transmitting portion 57 is larger than the pitch of the pixel 41a, even if the transmitting portion 57 overlaps the non-light emitting portion 41b of the display surface 41 of the liquid crystal display 40, the ratio of a portion overlapping the non-light emitting portion 41b to one transmitting portion 57 is sufficiently small. Therefore, the amount of image light transmitting through the transmitting portion 57 only decreases slightly. On the other hand, as illustrated in the lower right figure of FIG. 7, in a case where the pitch of the transmitting portion 57 is less than the pitch of the pixel 41a, if the transmitting portion 57 overlaps the non-light emitting portion 41b of the display surface 41 of the liquid crystal display 40, the ratio of the portion overlapping the non-light emitting portion 41b to one transmitting portion 57 significantly increases. Therefore, the amount of image light transmitting through the transmitting portion 57 significantly decreases.

Consequently, in the decorative sheet 50 in which the transmitting portion 57 is formed so that the pitch of the transmitting portion 57 is less than the pitch of the pixel 41a, the transmitting portion 57 having very little image light is periodically generated, which adversely affects an image to be observed. In order to prevent the occurrence of such an adverse effect, it is necessary to properly arrange and accurately align the transmitting portions 57 so that the transmitting portion 57 does not overlap the non-light emitting portion 41b of the display surface 41 of the liquid crystal display 40.

From these viewpoints, it is preferable to form the transmitting portion 57 so that the pitch of the transmitting portion 57 is larger than the pitch of the pixel 41a.

Further, in the decorative sheet 50 according to the present embodiment, the pitch of the transmitting portion 57 and the pitch of the pixel 41a preferably have a relationship of $Y<X(A\times X+B)$ from the viewpoint of suppressing the occurrence of moire as described below, where the pitch of the transmitting portion 57 is denoted by X and the pitch of the pixel 41a is denoted by Y. Here, A and B are constants obtained by theoretical calculations using the observation results of the decorative sheet 50 actually produced, as described below.

As described above, the transmitting portion 57 of the decorative sheet 50 according to the present embodiment is formed by arranging the circular transmitting portions 57 in a square grid pattern when observed from the normal direction of the decorative sheet 50. Further, the pixels 41a of the dot matrix display are also usually arranged in a square grid pattern. As described above, since it is preferable that the pitch of the transmitting portion 57 is larger than the pitch of the pixel 41a, the pitch of the transmitting portion 57 and the pitch of the pixel 41a are usually different. That is, the transmitting portion and the pixel 41a have a different periodic pattern. Consequently, when the decorative sheet 50 having such a transmitting portion 57 and the display having such a pixel 41a are overlapped with each other, there is a problem that moire is generated due to the difference in the period of the periodic patterns of the transmitting portion 57 and the pixel 41a.

In general, a pitch Pm of a moire periodic pattern generated when a periodic pattern having the pitch Pa and a periodic pattern having pitch Pb are overlapped is calculated from the relational expression of Pm=Pa·Pb/|Pa−Pb|. As a result of research, the inventors of the present invention have found that the occurrence of moire that is visually recognized by an observer can be suppressed by setting the pitch Pm of the moire periodic pattern generated from the periodic pattern of the transmitting portion 57 and the periodic pattern of the pixel 41a to a certain value or less. As will be described below, it has been found that this constant value is preferably 300 μm based on the correlation between the observation results of the decorative sheet 50 actually produced and the results of theoretical calculations.

The observation results of the decorative sheet 50 actually produced are indicated in Table 1. "○" indicates that no moire is observed. "x" indicates that moire is observed. "Δ" indicates that moire is slightly observed.

TABLE 1

|  |  | PITCH OF TRANSMITTING PORTION |  |  |  |  |  |  |  |  |
|---|---|---|---|---|---|---|---|---|---|---|
| μm |  | 70 | 100 | 120 | 140 | 150 | 160 | 180 | 200 | 230 |
| PITCH | 44 | ○ | ○ | ○ | ○ | ○ | ○ | ○ | ○ | ○ |
| OF | 63 | ○ | ○ | x | ○ | ○ | ○ | ○ | ○ | ○ |
| PIXEL | 78 | ○ | ○ | x | x | ○ | ○ | ○ | x | ○ |
|  | 96 | ○ | x | x | x | x | Δ | Δ | x | Δ |
|  | 118 | ○ | x | x | x | x | x | x | x | x |
|  | 156 | ○ | x | x | x | Δ | x | x | x | x |
|  | 193 | ○ | ○ | Δ | x | x | x | Δ | x | x |

The theoretical calculation is basically performed by substituting the values of the pitch X of the transmitting portion 57 and the pitch Y of the pixel 41a into the above equation of Pm=Pa·Pb/|Pa−Pb| for the purpose of calculating the moire pitch Pm (=X·Y/|X−Y|. When the moire pitch Pm is a certain value that is set appropriately or less, it is determined as "○", and when the moire pitch Pm is larger than the certain value, it is determined as "x", so that a table similar to Table 1 is created. A plurality of such tables are created with different constant values, and these tables are compared with Table 1 that shows the observation results of the decorative sheet 50 actually produced. As a result, it has been found that when the constant value is set to 300 μm, the table created by the theoretical calculation matches Table 1 that shows the observation results of the decorative sheet 50 actually produced. Table 2 is a table created by the theoretical calculation when the constant value is set to 300 μm.

TABLE 2

|  |  | PITCH OF TRANSMITTING PORTION |  |  |  |  |  |  |  |  |
|---|---|---|---|---|---|---|---|---|---|---|
| μm |  | 40 | 50 | 60 | 70 | 80 | 90 | ... | 220 | 230 |
| PITCH | 30 | ○ | ○ | ○ | ○ | ○ | ○ | ... | ○ | ○ |
| OF | 40 | ○ | x | ○ | ○ | ○ | ○ | ... | ○ | ○ |
| PIXEL | 50 | ○ | x | x | ○ | ○ | ○ | ... | ○ | ○ |
|  | 60 | ○ | ○ | x | x | x | ○ | ... | ○ | ○ |
|  | 70 | ○ | ○ | ○ | x | x | x | ... | ○ | ○ |
|  | 80 | ○ | ○ | ○ | x | x | x | ... | ○ | ○ |
|  | 90 | ○ | ○ | ○ | ○ | x | x | ... | ○ | ○ |
|  | 100 | ○ | ○ | ○ | ○ | x | x | ... | x | x |
|  | 110 | ○ | ○ | ○ | ○ | ○ | x | ... | x | x |
|  | 120 | ○ | ○ | ○ | ○ | ○ | ○ | ... | x | x |
|  | 130 | ○ | ○ | ○ | ○ | ○ | ○ | ... | x | x |

The actual theoretical calculation is performed by taking the period at a bias angle of 0 to 45 degrees into consideration in view of the decorative sheet 50 extending two-dimensionally. Specifically, the moire pitch Pm at each of ten bias angles of 0 degrees, 5 degrees, 10 degrees, 15 degrees, 20 degrees, 25 degrees, 30 degrees, 35 degrees, 40 degrees, and 45 degrees is calculated, and when the number of the moire pitches Pm that are equal to or larger than the constant value is less than five, it is determined as "○", and when the number of such moire pitches Pm is larger than or equal to five, it is determined as "x".

Figure 11:
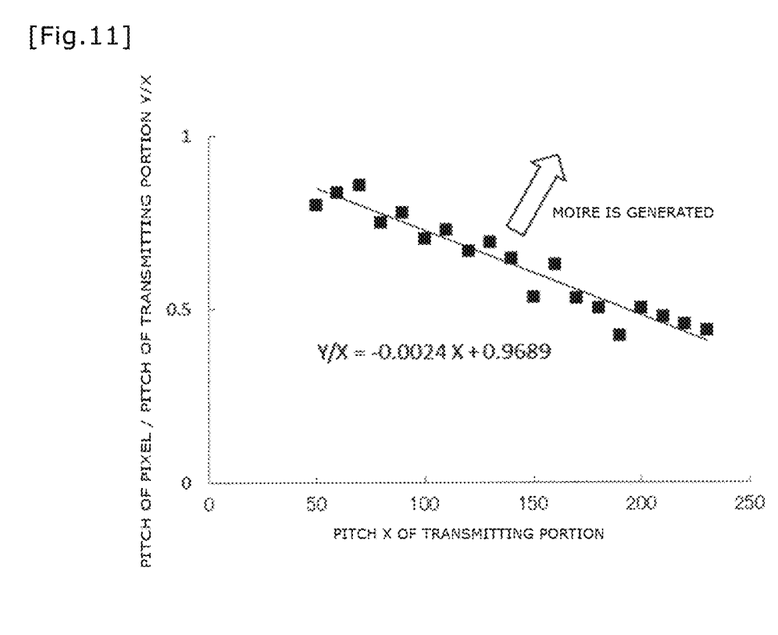
FIG. 11 is a graph illustrating a relationship between a pitch X of the transmitting portion and a pitch Y of a pixel under the boundary condition where moire is generated.

FIG. 11 is a graph illustrating a relationship between the pitch X of the transmitting portion and the pitch Y of a pixel under the boundary condition where moire is generated. In this graph, the horizontal axis indicates the pitch X of the transmitting portion 57, the vertical axis indicates the ratio Y/X of the pitch Y of the pixels 41a to the pitch X of the transmitting portion 57, and a value is plotted, the value being obtained when it is determined as "x" for the first time in a case where the pitch of a pixel is increased at each of the pitches of the transmitting portion in Table 2. It is understood from FIG. 11 that the pitch X of the transmitting portion 57 and the ratio Y/X of the pitch Y of the pixel 41a to the pitch X of the transmitting portion 57 under the boundary condition where moire is generated have a substantially linear relationship. Such a linear relationship has been found as a result of research by the inventors of the present invention.

Consequently, from the viewpoint of suppressing the occurrence of moire, it is preferable to achieve the relationship of Y/X<(A×X+B), that is, Y<X·(A×X+B), where the pitch of the transmitting portion 57 is denoted by X and the pitch of the pixel 41a is denoted by Y. Further, it can be said from FIG. 11 that preferably, A=−0.0024 and B=0.97, where the unit of X and Y is μm. That is, from the viewpoint of suppressing the occurrence of moire, it is preferable to achieve the relationship of Y [μm]<X [μm]·(−0.0024×X [μm]+0.97), where the pitch of the transmitting portion 57 is denoted by X and the pitch of the pixel 41*a* is denoted by Y.

Figure 8:
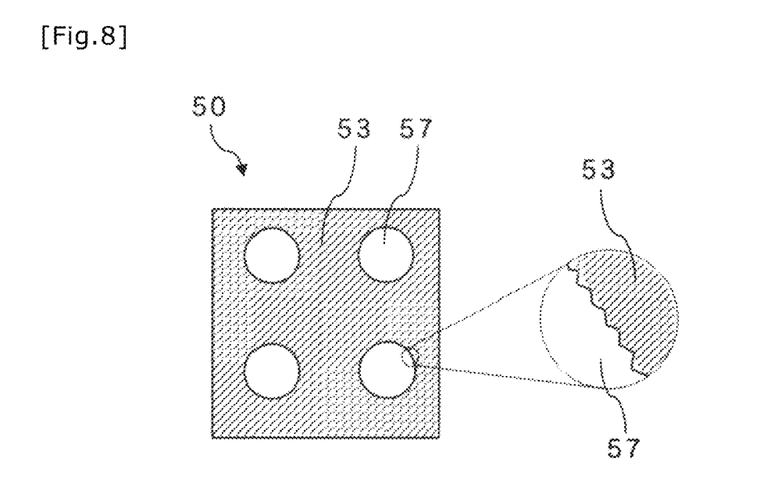
FIG. 8 is an enlarged front view for explaining light scattering at an edge of the transmitting portion of the decorative sheet according to the present embodiment.

FIG. 8 is an enlarged front view for explaining light scattering at an edge of the transmitting portion 57 of the decorative sheet 50. As illustrated in FIG. 8, the edge of the transmitting portion 57 of the decorative sheet 50 has fine irregularities, and the image light transmitting through the transmitting portion 57 is scattered by these irregularities.

The shorter the edge length of the transmitting portion 57 per unit area when observed from the normal direction of the decorative sheet 50, the more the scattering of the image light is suppressed. When the aperture ratio of the decorative sheet is constant, the longer the distance between adjacent transmitting portions 57, the shorter the edge length of the transmitting portion 57 per unit area, and the image light is less scattered. Consequently, even if the transmitting portion 57 is formed so that the distance between the adjacent transmitting portions is 40 μm or more, the scattering of the image light is suppressed, so that degradation in an image on the display device 40 is also suppressed.

A circle has the shortest peripheral length among the figures having the same area. For this reason, the transmitting portion 57 of the decorative sheet 50 preferably has a circular shape when observed from the normal direction.

Samples A, B, and C in which circular transmitting portions 57 were formed in a square grid pattern on the decorative sheet 50 having the picture pattern portion 53 printed in black were produced under the following conditions, and the diffuse reflectance of these samples was measured using a spectrophotometer CM-600d manufactured by KONICA MINOLTA INC. (measurement conditions: light source C, field of view of two degrees).

A: Distance between transmitting portions . . . 85 μm, pitch of transmitting portion . . . 200 μm B: Distance between transmitting portions . . . 135 μm, pitch of transmitting portion . . . 265 μm C: Distance between transmitting portions . . . 154 μm, pitch of transmitting portion . . . 354 μm The ratio of edge lengths per unit area is A:B:C=1.80:1.34:1.00. The measured diffuse reflectance was A: 1.15%, B: 0.95%, and C: 0.88%. As described above, the shorter the edge length of the transmitting portion 57 per unit area, the lower the light diffusivity.

The decorative sheet 50 according to the present embodiment has the above characteristics, but from the viewpoint of improving the visibility of the design of the picture pattern portion 53 on the decorative sheet 50, values of the reflectance and haze preferably fall within a certain range to be described below.

The reflectance of the decorative sheet 50 is preferably 3% or more and 80% or less, and more preferably 5% or more and 80% or less. The lower limit value of the reflectance range, 3%, is a value obtained when the pattern of the picture pattern portion 53 is solid black. When the reflectance is 5% or more, the visibility of the design of the picture pattern portion 53 is sufficiently improved. However, when the reflectance exceeds 80%, the image light from the display device 40 and the reflected light from the picture pattern portion 53 is mixed, and the visibility of the image light is degraded. This reflectance value is a luminance reflectance value measured with a D65 light source and a field of view of 2°. An example of the measurement method is as follows.

(Measurement Method)

Measurement device: spectrophotometer CM-600d (manufactured by KONICA MINOLTA INC.)

Measurement conditions: D65 light source, field of view of 2°

Measurement value: Y (luminance reflectance)-SCI (including specular reflection height)

Measurement area: φ8 mm

The haze of a decorative sheet is preferably 1% or more and 40% or less. The lower limit value of this haze range, 1%, is the production limit. If the haze exceeds 40%, the scattering of the image light transmitting through the transmitting portion 57 becomes too large, and the visibility of the image light is degraded. This haze value is measured according to JIS K 7105. An example of the measurement method is as follows.

(Measurement Method)

Measuring device: Haze meter HM-150N (manufactured by MURAKAMI COLOR RESEARCH LABORATORY)

Measurement conditions: JIS K 7105

Measurement luminous flux: inlet opening of φ20 mm

In order to keep the reflectance and haze values of a decorative sheet within the above ranges, it is preferable that the picture pattern portion 53 contains a glitter pigment such as a silver pigment or a pearl pigment. In particular, when the picture pattern portion 53 is formed by multicolor printing, the glitter pigment such as a silver pigment or a pearl pigment is preferably used for at least one color.

The preferred embodiment of the decorative sheet 50 according to the present embodiment has been described above, but from the viewpoint of overall performance, the decorative sheet 50 according to the present embodiment is preferably a decorative sheet in which the aperture ratio is 5% or more and 30% or less, the resolution of the picture pattern portion 53 is 150 dpi or more, the reflectance is 80% or less, the haze is 40% or less, and the picture pattern portion 53 contains a glitter pigment.

Finally, the method of forming the transmitting portion 57 of the decorative sheet 50 will be described.

For example, the transmitting portion 57 is formed as follows. First, the picture pattern portion 53 and the shielding portion 55 are provided on the entire surface of the base material portion 51. Next, a laser is irradiated to a position on the base material portion 51 where the transmitting portion 57 is to be formed. The picture pattern portion 53 and the shielding portion 55 at the position where the laser is irradiated are removed. The position of the picture pattern portion 53 and the shielding portion 55, which have been removed, becomes the transmitting portion 57. In such a method of forming the transmitting portion 57, the cost increases in proportion to the area to be irradiated with the laser.

Alternatively, the transmitting portion 57 may be formed as follows by using a photolithography technique. First, the picture pattern portion 53 and the shielding portion 55 are provided on the entire surface of the base material portion 51. Next, a photoresist is applied to the side on which the picture pattern portion 53 and the shielding portion 55 are provided. After that, a photomask having holes at positions where the transmitting portion 57 is to be formed is provided on the photoresist. Ultraviolet rays are irradiated through the photomask. When irradiated with ultraviolet rays, the photoresist dissolves in a developer.

That is, the photoresist dissolves at the position where the transmitting portion 57 is to be formed during a development step. Next, the base material portion 51 is immersed in an etchant to remove the picture pattern portion 53 and the shielding portion 55 at the positions where the photoresist has been removed. The position of the picture pattern portion 53 and the shielding portion 55, which have been removed, becomes the transmitting portion 57. In such a method of forming the transmitting portion 57, the cost increases in proportion to the size of the photomask used and the size of a ultraviolet irradiation device.

The method of forming the transmitting portion 57 described above is an example, and the transmitting portion 57 may be formed by another method.

As described above, the decorative sheet, the display device with a decorative sheet, and the display device with a panel according to the present embodiment are excellent in the visibility of a picture pattern of the decorative sheet.

Various changes can be made to the embodiment described above.

For example, the decorative sheet 50 includes the base material portion 51 in the embodiment described above. However, the base material portion 51 may be removed from the decorative sheet 50 by being peeled off in the manufacturing process or the like. In this case, the transmitting portion 57 may be formed as a through-hole in the decorative sheet 50.

Figure 9:
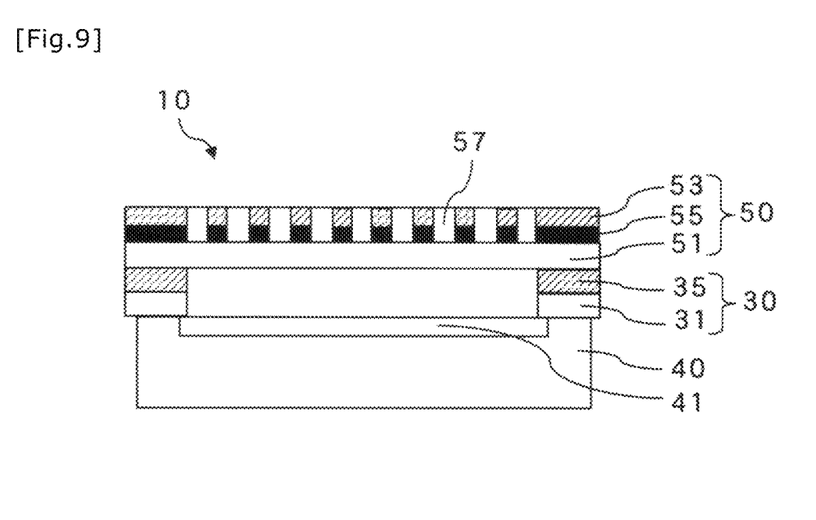
FIG. 9 is a cross-sectional view of a display device with a panel according to yet another embodiment of the present invention.

Further, as illustrated in FIG. 3, the transmitting portion is formed on the entire decorative sheet 50 in the embodiment described above. However, as illustrated in FIG. 9, the transmitting portion 57 of the decorative sheet 50 may be formed only in the region facing the display surface 41 of the display device 40. As the transmitting portion 57 is formed only in the region facing the display surface 41 of the display device 40, it is possible to reduce the manufacturing cost of the decorative sheet.

Figure 10:
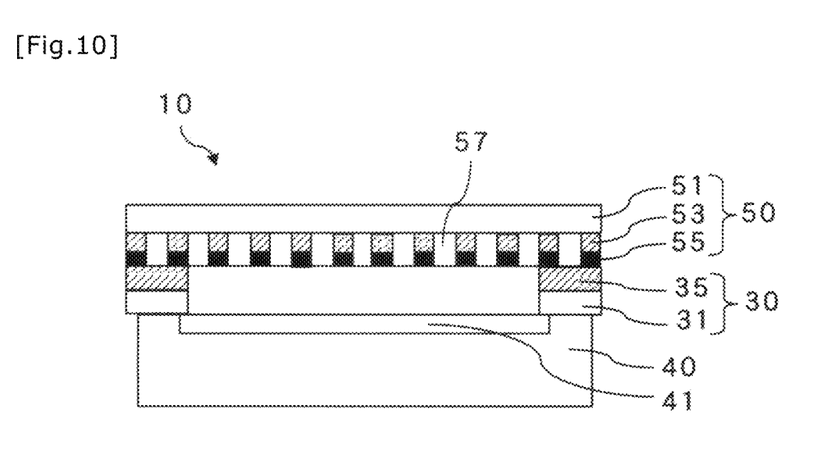
FIG. 10 is a cross-sectional view of a display device with a panel according to still another embodiment of the present invention.

Further, as illustrated in FIG. 3, the picture pattern portion 53 of the decorative sheet 50 is arranged on the side from which the display device 10 with a panel is observed in the embodiment described above. However, as illustrated in FIG. 10, the base material portion 51 of the decorative sheet 50 may be arranged on the side from which the display device 10 with a panel is observed. When the base material portion 51 of the decorative sheet 50 is arranged on the side from which the display device 10 with a panel is observed, it is less likely that foreign matters adhere to the transmitting portion 57 and obstruct image light.

The decorative sheet 50, the display device 20 with a decorative sheet, and the display device 10 with a panel according to the present invention are used for interior members or exterior members of moving bodies such as vehicles including automobiles and railways, aircrafts, ships, and spacecrafts. As a specific example, the decorative sheet 50, the display device 20 with a decorative sheet, and the display device 10 with a panel according to the present invention are used for a center console or a door trim of an automobile. Alternatively, the decorative sheet 50, the display device 20 with a decorative sheet, and the display device 10 with a panel according to the present invention may be incorporated and used in interior members or exterior members of buildings, electronic devices, furniture, or electric appliances.

REFERENCE SIGNS LIST

10 Display device with a panel
15 Panel
20 Display device with a decorative sheet
30 Panel member
30a Opening
31 Base material layer
35 Design layer
40 Display device
41 Display surface
50 Decorative sheet
51 Base material portion
53 Picture pattern portion
53a Pearl pigment
55 Shielding portion
57 Transmitting portion

The invention claimed is:

1. A device comprising:
a display device having a display surface; and
a decorative sheet facing the display surface, the decorative sheet comprising:
  a picture pattern portion; and
  a plurality of transmitting portions that are portions in which the picture pattern portion is not formed, wherein
  an aperture ratio of the decorative sheet is 5% or more and 50% or less,
  each of the transmitting portions is formed such that a distance between the transmitting portions adjacent to each other is 40 µm or more and 230 µm or less,
the display device is a dot matrix display, and
a pitch of each of the transmitting portions is larger than a pitch of pixels on the display surface.

2. A device comprising:
a display device having a display surface; and
a decorative sheet having a picture pattern portion and a plurality of transmitting portions that are portions in which the picture pattern portion is not formed, wherein
the display device is a dot matrix display, and
a pitch of each of the transmitting portions is larger than a pitch of pixels on the display surface.

3. The device according to claim 2, wherein
the display surface includes a non-light emitting portion that is configured as a black matrix having a width of 1 µm or more and 30 µm or less.

4. A device comprising:
a display device having a display surface;
a decorative sheet including a picture pattern portion and a plurality of transmitting portions that are portions in which the picture pattern portion is not formed; and
a panel member that is arranged between the display surface and the decorative sheet, wherein
the display device is a dot matrix display, and
a pitch of each of the transmitting portions is larger than a pitch of pixels on the display surface.

* * * * *